Nov. 24, 1931.  L. A. BECKER  1,833,348
PULLEY LINE SUPPORT AND TAKE-UP DEVICE
Filed March 28, 1930
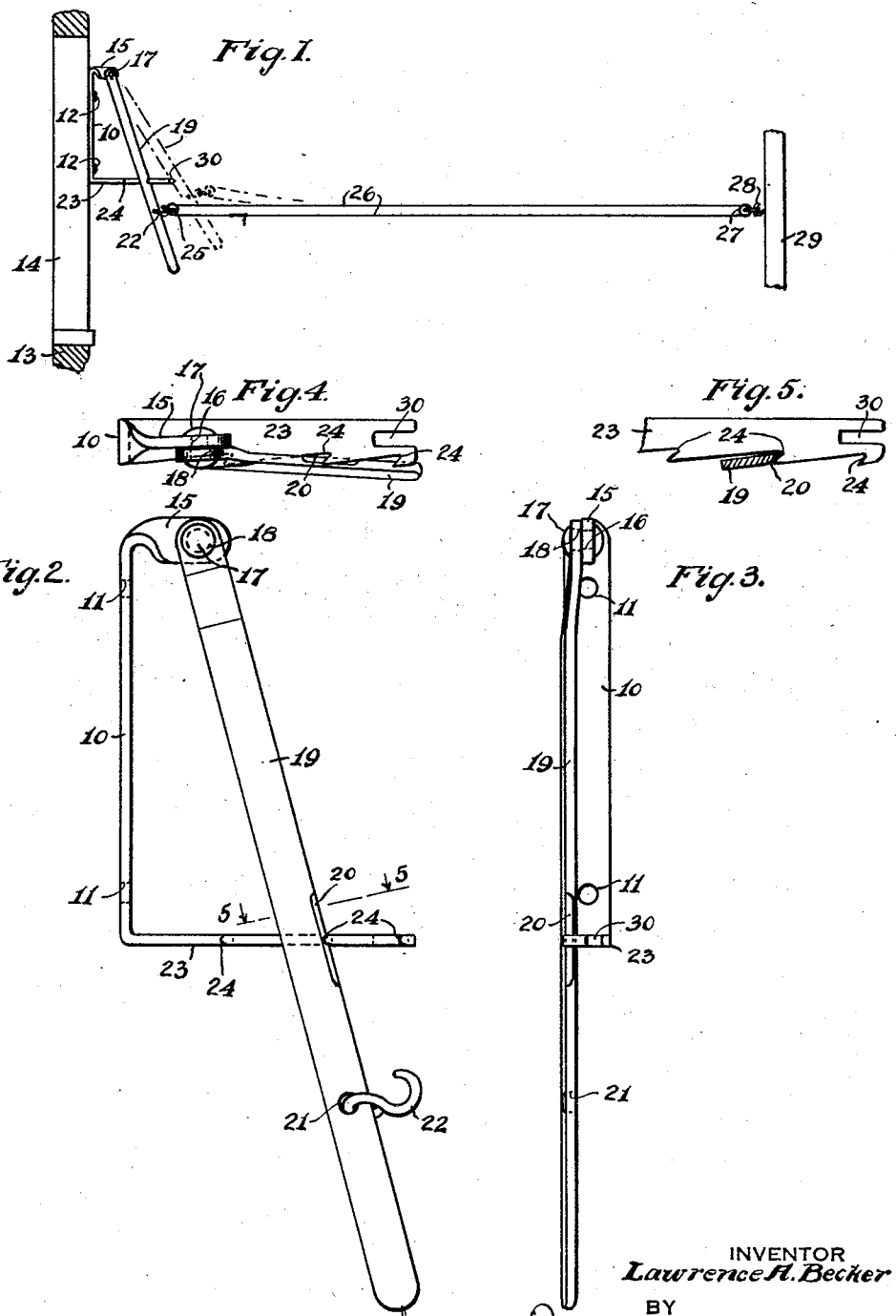
INVENTOR
Lawrence A. Becker
BY
ATTORNEY Patented Nov. 24, 1931

1,833,348

UNITED STATES PATENT OFFICE

LAWRENCE A. BECKER, OF MARBLE HILL, NEW YORK

PULLEY LINE SUPPORT AND TAKE UP DEVICE

Application filed March 28, 1930. Serial No. 439,674.

This invention relates to a pulley line take up device or adjustable support for attachment preferably to the outer wall surface of a building near and to the side of a window, door or the like.

An important object of the invention being to obviate objections and faults found in devices of this character, and to provide an exceptionally simple inexpensive supporting device for supporting clothes lines; which may be manipulated or used with a minimum exertion of energy, and at the same time perform desired functions as effectively as the more complicated or expensive devices designed for this purpose.

In all such devices it is essential that means should be provided for permitting shrinkage or shortening of the clothes line when not in service should it become wet, and for this purpose, I have evolved an unusally simple construction allowing for almost unlimited shrinkage of the line.

Another important feature of my invention resides in the fact that the construction is constituted by but two parts, having pivoted interconnection, and which may be expeditiously formed or shaped for high speed production.

In carrying out my invention, I may provide a wall bracket base member and a lever member pivoted thereto and coacting therewith for tensioning the clothes lines when in use, the lever member being formed and mounted to exert a slight spring or yielding contact with a portion of said bracket. The bracket member may be formed to provide a wall bearing or base portion, having suitable openings for the reception of fastening screws, bolts or pins, and may be angularly bent at the top and twisted to provide a perforated lug to which the lever member may be pivoted.

The base portion may be extended and bent at right angles to provide an outwardly directed ratchet arm provided with ratchet teeth or notches, and in the face of its end the arm is provided with a recess, notch or open slot to receive the lever member and support it in the inoperative or inactive position under normal line slacking conditions, said lever being so formed and supported that it maintains its alinement with the slot if withdrawn therefrom by excessive shrinkage of the line when wet permitting its gravitational return to the said slot as the line dries and stretches.

For a better interlocking engagement of the lever with the teeth of the ratchet arm I may provide the tensioning lever about midway of its length with a beveled portion having an angle substantially corresponding to the undercut faces of the said teeth, so that a short backward movement of, and a slight outward pull on the lever is necessary to disengage it when it is desired to ease the tension on the line.

In the accompanying drawings I have illustrated an embodiment now thought to be the best form, but the construction shown is illustrative only, and does not define the scope of the invention, and I reserve the right to make changes therein to meet varying conditions of use.

In the drawings,

Fig. 1 is a side elevation of the improved pulley line take-up device secured to a building wall close to a window opening, the device being shown is operative with an endless clothes line carried on pulleys, the remote end of said line being supported on a post or the like, the lever being indicated in the inoperative position by dot and dash lines.

Fig. 2 is an enlarged side elevation of the clothes line supporting device, the tensioning lever being shown in engagement with a tooth of the ratchet arm and in the central tensioning position.

Fig. 3 is a front elevation of the device.

Fig. 4 is a top or plan view thereof; and

Fig. 5 is a detail cross section of the tensioning lever taken in the line 5—5 of Fig. 2.

Referring now to the drawings in detail, I provide first a length of appropriate metal of strap like cross section, from which I preferably form a base portion 10, provided with openings 11 for the reception of fastening screws, bolts or pins 12 to secure it to a wall 13, near a window or door opening 14.

An end of the metal strap is outwardly bent at preferably a right angle to the base portion 10 and is given a quarter twist to provide a lug 15 with its width in a vertical plane, and which is perforated as at 16, to receive a headed cross pin 17, which also passes through a perforation 18, in the upper end of a tensioning lever 19, the lever being formed with a beveled portion 20 and provided with an orifice 21, in which a hook 22 or the like may be carried.

The end of the metal strap opposite the lug 15, may be bent or turned outwardly at preferably a right angle to provide a ratchet arm 23, provided with undercut ratchet teeth or notches 24 adapted to interlock with the beveled portion of the tensioning lever 19, in the operation of the device. The line tensioning lever is so formed and mounted that it exerts a slight yielding spring action toward or against the toothed or notched side edge of the ratchet arm 23.

In the practice of my invention, a pulley or roller 25 is attached to the hook member 22. The endless clothes line 26, is threaded over this pulley and is carried out over and around a companion pulley 27 which is carried on a hook 28 on a post 29 or the like.

In the inoperative position, the tensioning lever 19, should rest in a recess, notch or open slot 30, formed in the end face of the ratchet arm 23, this position being indicated by dot and dash lines in Fig. 1; and when in this position the line is slacked, but should it get wet by rain or otherwise it will tend to tighten up or shrink, frequently to such an extent the lever may be drawn out and away from the notch 30, but it will remain in removed alinement therewith, and will drop back into it when the line dries.

What I claim is:

1. In a pulley line supporting device, a base member, a lever suspended therefrom and to which a line is connected, the base member being provided with an outwardly projecting horizontal arm, the arm being provided with teeth on a side thereof, and with a slot in the end face thereof to support the lever in the slack position.

2. In a pulley line supporting device, a base member of strap material and a lever to which a line is connected, the base member having upper and lower outwardly and horizontal extending arms, the lever being pivotally carried by the upper arm, the lower arm being provided with side teeth and an open slot in the outer face of its free end to receive said lever in the projective slack position, said lever maintaining alinement with the slot when drawn therefrom by unusual shrinkage of the line permitting its gravitational return as the line stretches.

3. In a line support, a base member of strap material and a tensioning member pivoted one to the other, the base member having an arm provided with teeth and a notch in the face of its free end, the tensioning member having a beveled portion to interlock with said teeth, and being mounted and shaped to exert a yielding spring thrust toward the said toothed arm.

4. In a line support, a base member of strap material provided with outwardly turned parallel portions at its ends, the upper portion being twisted and perforated the lower portion being provided with teeth and a notch in the face of its free end, a lever pivoted to the upper portion and coacting with the lower portion to tension or slacken the line.

5. In a line support, a base member of strap material and a line tensioning member, the base member having a base portion, an integral perforated lug, and an integral toothed ratchet arm having a notch in the face of its outer end, the tensioning member being pivoted to said lug and having a beveled portion to interlock with the teeth of the ratchet arm during the tensioning period, said lever resting in said notch when in the inoperative position to permit of shrinkage of the line.

6. In a line support, a base member, a tensioning member pivoted to swing thereon, the base member having a horizontal arm, the arm being provided with ratchet teeth to receive said tensioning member for tensioning the line, and a notch in the face of its free end to receive said tensioning member to permit shrinkage of the line, the tensioning member being provided with a beveled portion to interlock with said teeth.

7. In a line support a base member embodying a base portion, a top twisted horizontal arm, a lower straight horizontal arm, the base portion being provided with openings, a tensioning member having pivotal connection with the top arm, the lower arm being provided with teeth to receive said tensioning member for tensioning the line, and a notch in the face of its free end to receive said tensioning member to permit shrinkage of the line.

Signed at New York, in the county of New York and State of New York this 27th day of March, A. D. 1930.

LAWRENCE A. BECKER.